United States Patent [19]

Toussaint

[11] 4,243,972

[45] Jan. 6, 1981

[54] METHOD OF AND APPARATUS FOR SIGNATURE CODED TARGET RECOGNITION

[75] Inventor: Stephen M. Toussaint, Elkhart, Ind.

[73] Assignee: Esmark, Incorporated, Mishawaka, Ind.

[21] Appl. No.: 25,266

[22] Filed: Mar. 29, 1979

[51] Int. Cl.³ .................................................. G09F 9/30
[52] U.S. Cl. .......................... 340/146.3 SY; 340/707; 340/712
[58] Field of Search ............... 340/707, 708, 709, 712, 340/723, 146.3 SY, 146.3 AH; 250/549

[56] References Cited

U.S. PATENT DOCUMENTS

| | | |
|---|---|---|
| 3,189,889 | 6/1965 | Bridgett .............................. 340/707 |
| 3,292,489 | 12/1966 | Johnson et al. ...................... 340/712 |
| 3,498,692 | 3/1970 | Jewitt et al. ......................... 340/707 |
| 3,891,890 | 6/1975 | Yasuda et al. ....................... 340/707 |
| 3,917,955 | 11/1975 | Inuiya .................................... 340/707 |
| 3,995,269 | 11/1976 | Schumacher ........................ 340/707 |
| 4,104,617 | 8/1978 | Bean et al. ............................ 340/707 |

Primary Examiner—Leo H. Boudreau
Attorney, Agent, or Firm—Oltsch, Knoblock & Hall

[57] ABSTRACT

A method of and apparatus for identifying a selected target among a field or group of targets wherein each of the targets is caused to assume a unique characteristic. The characteristic of the selected target is sensed and compared to a record of the characteristics of all the targets. Correlation of the selected characteristic with one of the characteristics of record identifies the selected target.

8 Claims, 5 Drawing Figures

Fig.1
| TARGET | ASSIGNED CODE PATTERN |
|---|---|
| T1 | — — — — 0-0 |
| T2 | — — — — 0-1 |
| T3 | — — — — 1-0 |
| T4 | — — — — 1-1 |
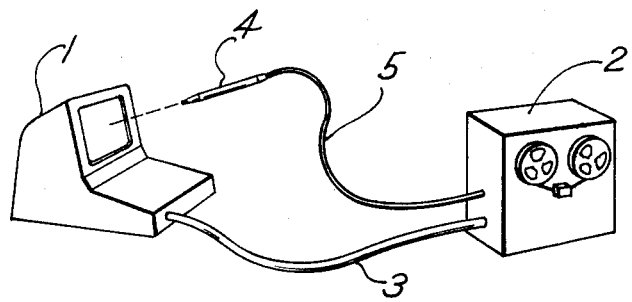
Fig.2
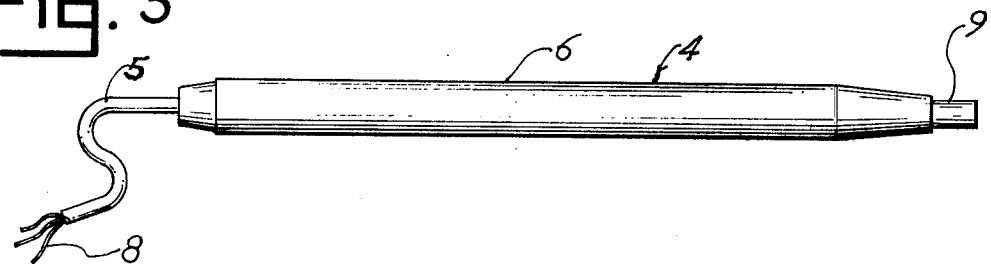
Fig.3
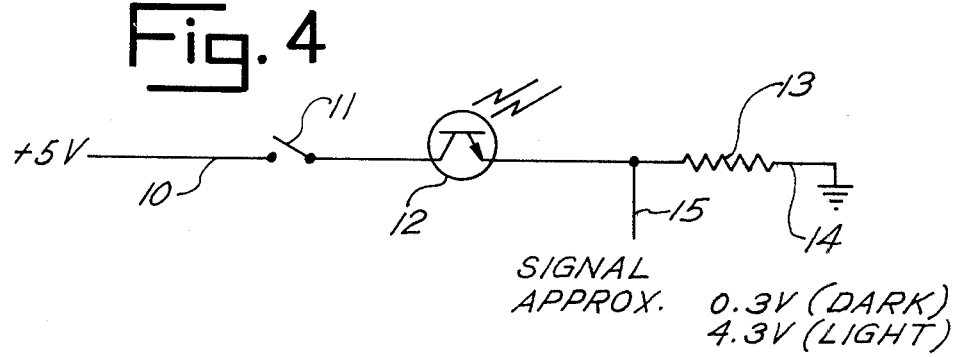
Fig.4
SIGNAL APPROX. 0.3V (DARK) 4.3V (LIGHT)
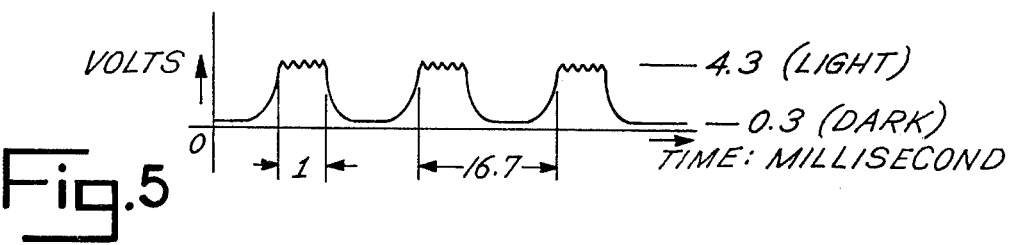
Fig.5

METHOD OF AND APPARATUS FOR SIGNATURE CODED TARGET RECOGNITION

SUMMARY OF THE INVENTION

This invention relates to a method of and apparatus for identifying a particular desired target among a field or group of targets. The field or group may be displayed on the cathode-ray tube (CRT) of a computer system video display unit or other field containing multiple discrete target elements.

Each of the discrete target elements within the field is caused to undergo a change of state or "signature" in a pattern unique to it. The pattern of change undergone by the selected target is sensed and compared to a record of the patterns of all of the targets. Correlation between the pattern sensed by the apparatus and one of the patterns of record identifies the desired target.

The apparatus of this invention is a stylus which a computer user may employ to select a character on the face of a CRT. The apparatus then initiates the method of this invention and senses the selected character's pattern of change for communication to the computer. By this method the computer can recognize which character has been selected by the user.

Accordingly, it is an object of this invention to provide a method of target recognition whereby a particular desired target may be identified among a multiplicity of targets.

Another object is to provide a method of target recognition wherein each of a multiplicity of targets is caused to assume a unique characteristic or state.

Another object is to provide a method of target recognition wherein the characteristic or state of a desired target is sensed by sensing means.

Another object is to provide a method of target recognition wherein the characteristic or state of the desired target is compared with a record of the characteristics or states possessed by all of the targets in a group.

Another object is to provide a method of target recognition wherein a correlation is sought between a set of target characteristics or states of record and the characteristic or state of the desired target.

Another object is to provide a method of target recognition wherein the correlation of a desired target's characteristic or state and a characteristic or state of one of a group of targets identifies the desired target as the one to which the particular characteristic or state has been assigned.

Yet another object is to provide an apparatus for use with computer cathode-ray tube display units which a user may employ to select a character on the face of the cathode ray tube.

Another object is to provide an apparatus which will initiate the selection method of this invention through a computer.

Another object is to provide an apparatus which will sense the characteristic or state of a desired target.

Another object is to provide an apparatus which will communicate a desired characteristic or target to a computer.

Another object is to provide an apparatus which is inexpensive to manufacture and convenient and efficient in use.

Other objects will become apparent from the following specification.

BRIEF DESCRIPTION OF THE DRAWINGS

FIG. 1 is a table in which four hypothetical targets, T1-T4, have been assigned specific and unique code patterns.

FIG. 2 is a perspective view of the apparatus of this invention showing its association with a computer and a cathode ray tube display unit.

FIG. 3 is a side view of the apparatus of this invention.

FIG. 4 is a schematic or diagram of the circuit contained within the apparatus of this invention.

FIG. 5 is a voltage-versus-time graph of a signal output from the circuit of FIG. 4.

DESCRIPTION OF THE PREFERRED EMBODIMENTS

The preferred embodiments illustrated are not intended to be exhaustive nor to limit the invention to the precise form disclosed. They are chosen and described to explain the principles of the invention and its application and practical use, to thereby enable others skilled in the art to best utilize the invention.

One embodiment of the invention is shown in FIGS. 2-4 as applied to a computer and cathode ray tube (CRT) system. A CRT 1 is connected to a computer 2 by a cable or other conductor 3. A manually held member, such as a stylus or pen 4, is connected to the computer 2 by means of a cable 5. The pen 4 is adapted to be pressed endwise against the face of the CRT 1 at a position selected from the characters appearing on the face of the CRT.

The pen 4 is preferably housed within an elongated tubular housing 6 within one end of which is telescopically and slidably received an elongated end member 9 which normally is urged to a selected extended position by a spring (not shown). Cable 5 is connected to the opposite end of the pen housing 6 and contains a plurality of lead wires 8 connected to the computer 2. Lead wires 8 are connected to the components of a circuit housed within the pen housing 6 and including conductors 10, 14 and 15, as illustrated in FIG. 4. Lead 10 is preferably a current supply lead, for example, a lead supplied with five volts. Lead 14 is connected to ground. Lead 15 is connected to the computer 2 and constitutes a signal output lead. The circuit includes switch 11 which is normally open but is connected to and responsive to movement of end member 9 from normal position i.e., switch 11 is closed when the member 9 is pressed endwise into the housing 6, as by pressing thereof against the surface of the CRT 1.

The circuit in pen 4 includes a resistor 13 and a phototransistor or a diode 12. The transistor 12 responds to light emitted by the character on the face of the CRT 1 at which the pen is pointed, as through member 9 when the member 9 is tubular or of light transmitting character. The response of transistor 12 is a decrease of its electrical resistance. The voltage drop thereby produced across resistor 13 produces a signal voltage or output to the computer.

FIG. 5 represents the voltage signal on the lead 15 which varies according to the pattern of binary coded light emitted at the character, location or area of a CRT screen at which the light transmitting end piece 9 of the hand-held pen 4 is pointed. The voltage signal transmitted from the pen as it is held at selected position and resulting from successive scans by the CRT electron beam depends on the on-off status or blinking pattern of the beam at the character, area or location of CRT 1 to which the light transmitting end piece 9 of the hand-held member 4 is applied or pressed. As illustrated in FIG. 5, none of the electron beam scans have been cancelled or suppressed at the chosen character, area or location and thus the pattern represented by the diagram would be interpreted as binary "1" signal which appears regularly at approximately 16 millisecond intervals. If one of the scans had been cancelled or suppressed at the chosen area, character or location, one of the voltage pulses illustrated in FIG. 5 would be absent. The absence of the voltage pulse would be interpreted as a binary "0".

It will be understood that the CRT screen will have recognizable or readable symbols at different areas or locations, each area or location having correlated thereto a distinctive characteristic, such as a binary computer code. Further, this binary code may be composed of a series of "0"s and "1"s. Application of the tip 9 of the manually held pen or member 4 to a selected symbol appearing on the CRT screen in a manner to close the circuit of the pen at the switch 11 serves to actuate the computer 2 by its response electrically to the light at the selected symbol or by the electrical pulse caused by the closing of switch 11.

With reference to FIG. 1, the method of this invention may be illustrated by assigning to each of multiple targets, such as T1-T4 on CRT 1, a unique binary code pattern as shown. This code pattern becomes each target's unique signature. Each of the target elements is capable of changing its state in a way which may be sensed, as by a change in the element's energy emission, reflection or absorption.

By assigning to one target element state the value of binary "1" and to a second target element state the value of binary "0", target characteristics of a large number of targets, areas or locations on a CRT screen may be expressed as a series of "1"s and "0"s. During successive time periods or scanning cycles of the CRT, the state of the target, area or location chosen by the position of the pen will be sensed and its state converted to signals interpreted as binary "1"s and "0"s.

Referring to FIG. 1, assuming that one target, area or location of a group or set is to be selected by use of the apparatus as shown in FIG. 2, if, during a first time period or scanning cycle of the CRT, while pen 4 is operatively positioned at a specific target, area or location, a state or signal corresponding to binary "1" is sensed, and during a second or succeeding time period or scanning cycle a state or signal corresponding to binary "0" is sensed, the target, area or location having the code "1-0" is identified by the signal or change of state thereof. Assuming, as seen in FIG. 1, that one of the assigned code patterns is "1-0", the practice of the method has found or indicated a correlation between the assigned code pattern and the chosen character, area or location pattern. Thus, the target, area or location for which this correlation exists, incident to use of pen 4 in this manner, in the record of patterns as shown in FIG. 1, is "T3".

One or a number of pen-indicated targets, areas or locations can be sequentially identified from a group of targets, areas or locations on the CRT screen by this method. The code pattern may consist of as many binary digits as are necessary in order to assign to each target, area or location on the CRT screen a unique code. Additionally, more than one target, area or location can be selected concurrently by employing multiple pens 4. The identification characteristic or signature need not be a binary code, but may be of any type desired.

In this method as applied to a CRT and computer system as shown in FIG. 2, the target elements may be characters applied on the face of the CRT 1 by the computer 2. By allowing the computer to recognize which character, area or location on the face of the CRT 1 has been selected by the positioning of pen 4, this method and apparatus makes possible a computer-user interaction without the need for other forms of user input devices.

It will be understood that targets, areas or locations on the face of the screen of a CRT 1 are made visible by an electron beam which excites phosphorescent material to luminescence. The electron beam sweeps from one upper corner of the CRT screen along spaced horizontal lines to the diagonally opposite lower corner of the screen to complete a scan cycle. As a character on the face of the screen of a CRT is formed by the electron beam, the phosphorescent material is excited to luminescence. After the electron beam passes each target, area or location of the CRT screen, the luminescence thereat diminishes until the beam returns on the next scan to renew the visibility of that target, area or location. Because the electron beam scans occur very rapidly, a viewer does not notice the dimming of characters between scans.

If the state of brightness that exists when a target area or location is being excited by the electron beam is assigned the value of binary "1", and the state of relative darkness or dimming which results thereat when that target, area or location is not excited by a succeeding beam scan is assigned the value of binary "0", the phototransistor 12 can sense these states. Binary codes can then be formed as previously explained by successive combination of excitations and nonexcitations at a chosen target, area or location on the CRT screen during successive scans of the electron beam. When a chosen target, area or location is not excited it will remain in the dimmed state. The absence of light emission from the chosen target, area or location of the screen during a scan will thus represent a binary "0".

While the invention has been described herein with references to the use of light generating and light responsive elements, it will be understood that the method and apparatus described can utilize other mwdia, for example, sound generating and sound responsive elements, magnets and magnet responsive elements, radio frequency sources and elements responsive to radio frequencies, or color generating means and color responsive means.

From the foregoing description it will be seen that the method entails the connection of a cathode ray tube (CRT) having multiple individually coded signals or targets, areas or locations upon its face or screen with a computer, connection to the computer of a hand-held pen or stylus having an electrical circuit including a normally open switch and a transistor responsive to a signal directed thereat, and application of the pen to a selected target, area or location of the CRT screen in a manner to close the switch in the pen and actuate the signal-responsive element of the pen to control the computer.

What I claim is:

1. In a method for signature coded target recognition, the steps of assigning to each of multiple targets a unique binary characteristic, selecting a particular target from among the multiplicity of targets, causing each target to successively assume its unique characteristic binary state, sensing the binary state characteristic of the selected target by sensing means, storing the sensed binary state of the selected target, repeating the process for each digit of the binary code of the target, comparing the sensed (characteristic) and stored multiple digit code to a record of the binary characteristics of all of the targets to find a correlation between the sensed and stored binary code characteristic of the selected target and (a) the correlated characteristic of said record, and thereby securing identification of the selected target as the target to which the correlated recorded binary characteristic had been assigned.

2. The method of claim 1 wherein the targets are characters on the face of a cathode ray tube.

3. The method of claim 2 wherein the sensing means utilizes a phototransistor.

4. The method of claim 1 wherein the characteristic as sensed by the position of the sensing means is a change in the phosphorescence of the discrete manually selected area on the face of a cathode ray tube at the chosen position.

5. The method of claim 1 wherein the assigned target characteristics constitute a sequence of discrete states corresponding to binary digits "0" and "1".

6. The method of claim 5, wherein the binary digits are indicated by the periodic excitations of or dimming of the phosphorescence at the targets on the face of a cathode ray tube incident to a succession of scans by an electron beam and wherein renewal of a light pulse during such succession of scans indicates binary "1" and the dimming of a target during such successive scans indicates binary "0".

7. The method of claim 1, wherein each target is assigned a characteristic of one of a multiplicity of characteristics recorded in a correlated computer.

8. In combination, a computer, a cathode ray tube having a surface upon which multiple light emitting targets, areas or locations having different codes are visible, said computer having a record of all codes of all targets of said tube, and a manually positioned pen for application to said tube surface at a selected target, area or location, said pen having a housing shiftably mounting a light conductive member spring biased to a normal inoperative position and manually shiftable to an operative position when manually pressed against said tube surface at a selected target, area or location, and an electrical circuit in said pen to activate said computer in response to the code of and to identify the selected target, said circuit including a normally open switch adapted to close when said light conductive member is in operative position and a transistor in said housing sensitive to light transmitted from said selected tube target by said light conductive member.

* * * * *